Oct. 30, 1956  R. M. GOODWIN  2,768,480
DYNAMO BRUSH MACHINE
Original Filed Sept. 30, 1948  6 Sheets-Sheet 1

INVENTOR.
RICHARD M. GOODWIN
BY
Spencer, Hardman and Fehr
HIS ATTORNEYS

Oct. 30, 1956   R. M. GOODWIN   2,768,480
DYNAMO BRUSH MACHINE
Original Filed Sept. 30, 1948   6 Sheets-Sheet 2

INVENTOR.
RICHARD M. GOODWIN
BY
*Spencer, Hardman and Febr*
HIS ATTORNEYS

Oct. 30, 1956   R. M. GOODWIN   2,768,480
DYNAMO BRUSH MACHINE
Original Filed Sept. 30, 1948   6 Sheets-Sheet 3
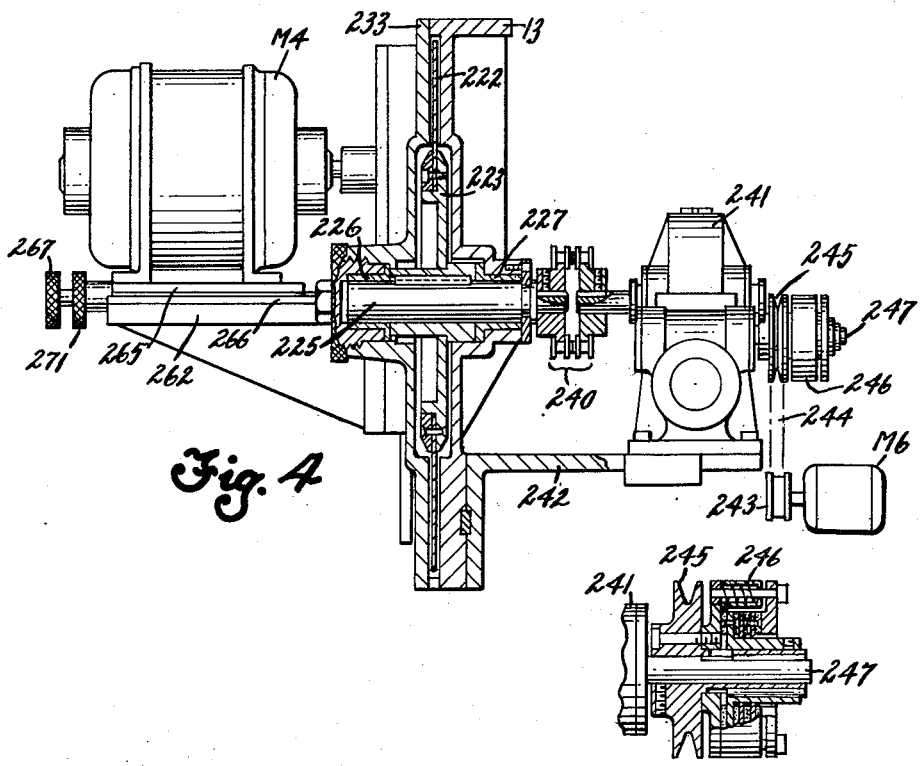
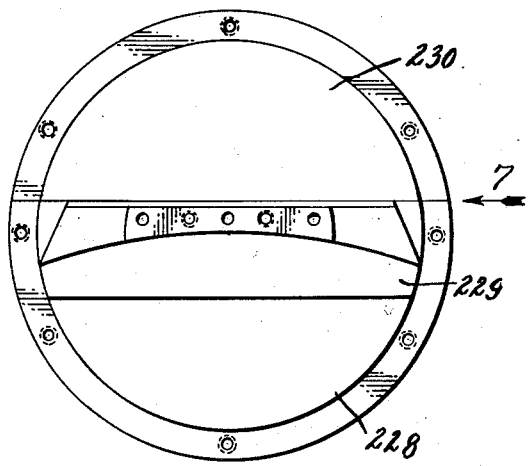
INVENTOR.
RICHARD M. GOODWIN
BY
Spencer, Hardman and John
HIS ATTORNEYS INVENTOR
RICHARD M. GOODWIN
BY Spencer, Hardman and Fehr
HIS ATTORNEYS

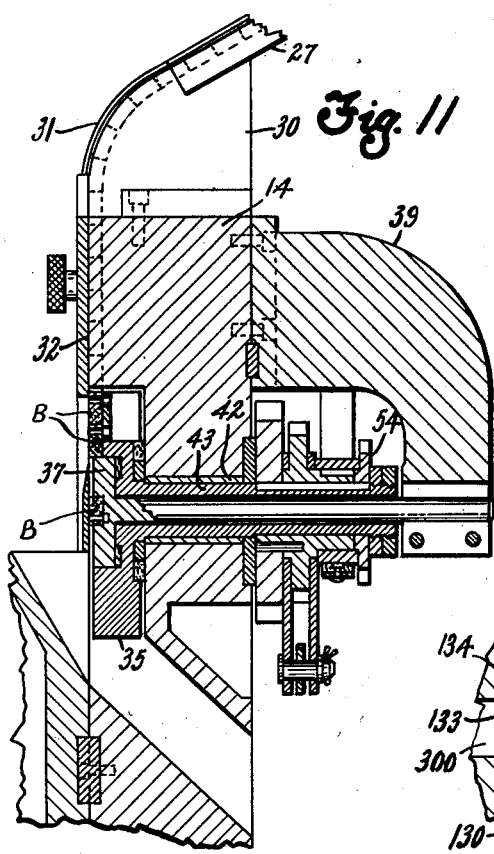
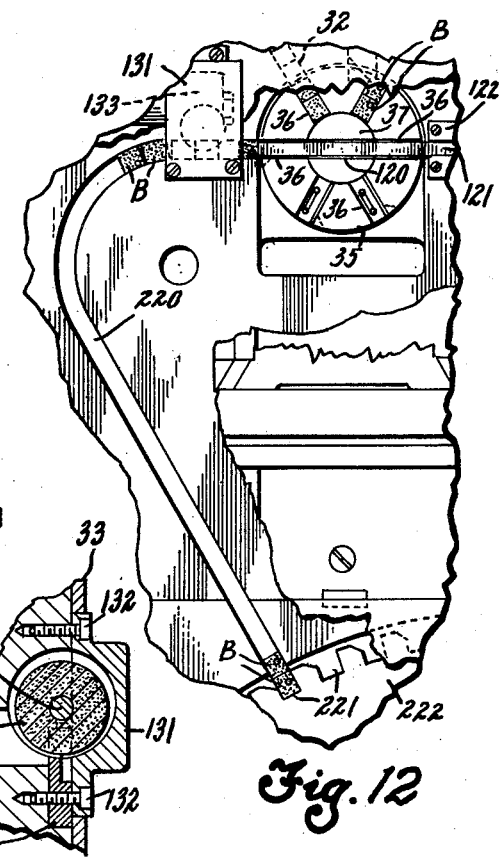
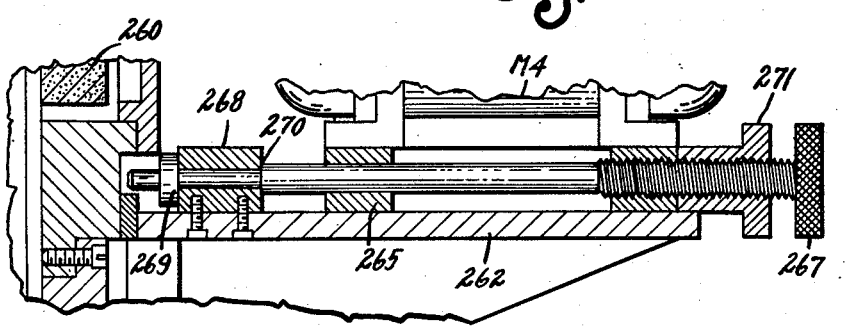

Oct. 30, 1956    R. M. GOODWIN    2,768,480
DYNAMO BRUSH MACHINE
Original Filed Sept. 30, 1948    6 Sheets-Sheet 6

INVENTOR.
RICHARD M. GOODWIN
BY
*Francis, Hardman and Felix*
HIS ATTORNEYS

United States Patent Office 2,768,480
Patented Oct. 30, 1956

2,768,480

DYNAMO BRUSH MACHINE

Richard M. Goodwin, Anderson, Ind., assignor to General Motors Corporation, Detroit, Mich., a corporation of Delaware Original application September 30, 1948, Serial No. 52,006. Divided and this application April 15, 1952, Serial No. 282,407

3 Claims. (Cl. 51—118)

The present invention relates to the manufacture of commutator brushes for dynamo electric machines.

This application is a division of my copending application Serial No. 52,006, filed September 30, 1948, now Patent No. 2,628,511.

One of my objects is to provide a machine which performs successively the following operations: concave grinding of the commutator engaging surface of the brush and parallel grinding of the side surfaces thereof.

The aforementioned and other objects are accomplished in the present invention by allowing the brushes to descend from a hopper through a chute and into a dial having pockets, each of which receives two brushes from the chute. At one station, the brushes are ejected from the dial and are passed under the surface of a grinding wheel for effecting concave grinding of their commutator engaging surfaces. After this operation, the brushes descend through a second chute and into engagement with a pair of grinding wheels which respectively grind the side surfaces of the brushes. Thereafter the brushes are transferred to a conveyor belt that carries the finished brushes to a box.

Further objects and advantages of the present invention will be apparent from the following description, reference being had to the accompanying drawings, wherein a preferred embodiment of the present invention is clearly shown.

In the drawings:

Fig. 4 is a sectional view taken along line 4—4 of Fig. 1.

Fig. 5 is a longitudinal, sectional view of the torque limiting clutch 246 of Fig. 4.

Fig. 6 is a view, in elevation, of parts 228 and 230 shown in Fig. 2.

Fig. 7 is a view in the direction of arrow 7 of Fig. 6.

Fig. 8 is a view, in elevation, of part 232 shown in Fig. 6.

Fig. 11 is an enlarged fragmentary sectional view taken along line 11—11 of Fig. 1.

Figure 1:
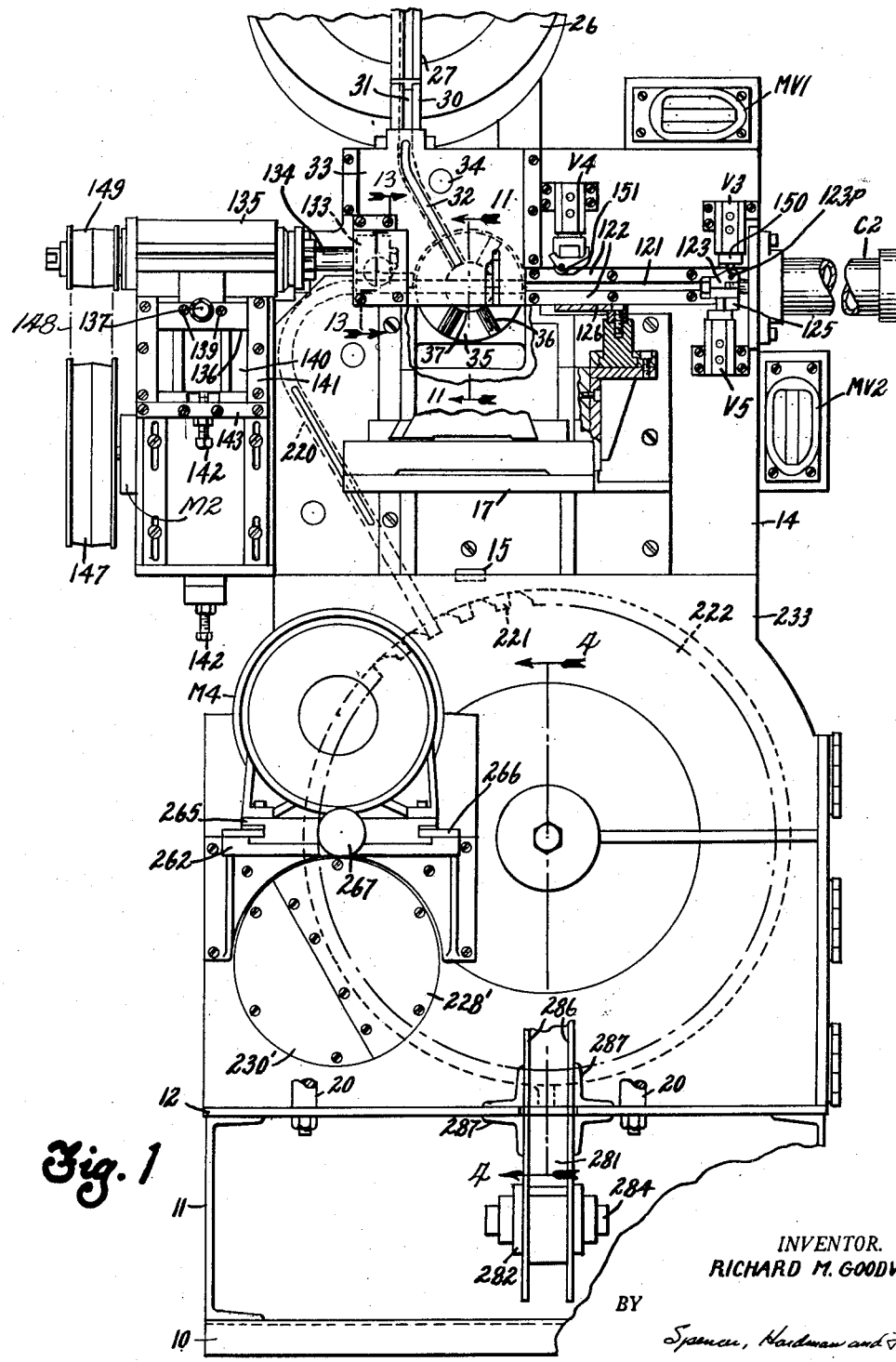
Fig. 1 is a view of the machine, partly in section and partly in elevation, certain parts being omitted.

Fig. 12 is an enlarged fragmentary part of Fig. 1 showing how the brushes are pushed out of the dial 35 past the grinding wheel 133 and gravitate to the disc 222.

Fig. 13 is an enlarged sectional view taken along line 13—13 of Fig. 1.

Figures 2, 3:
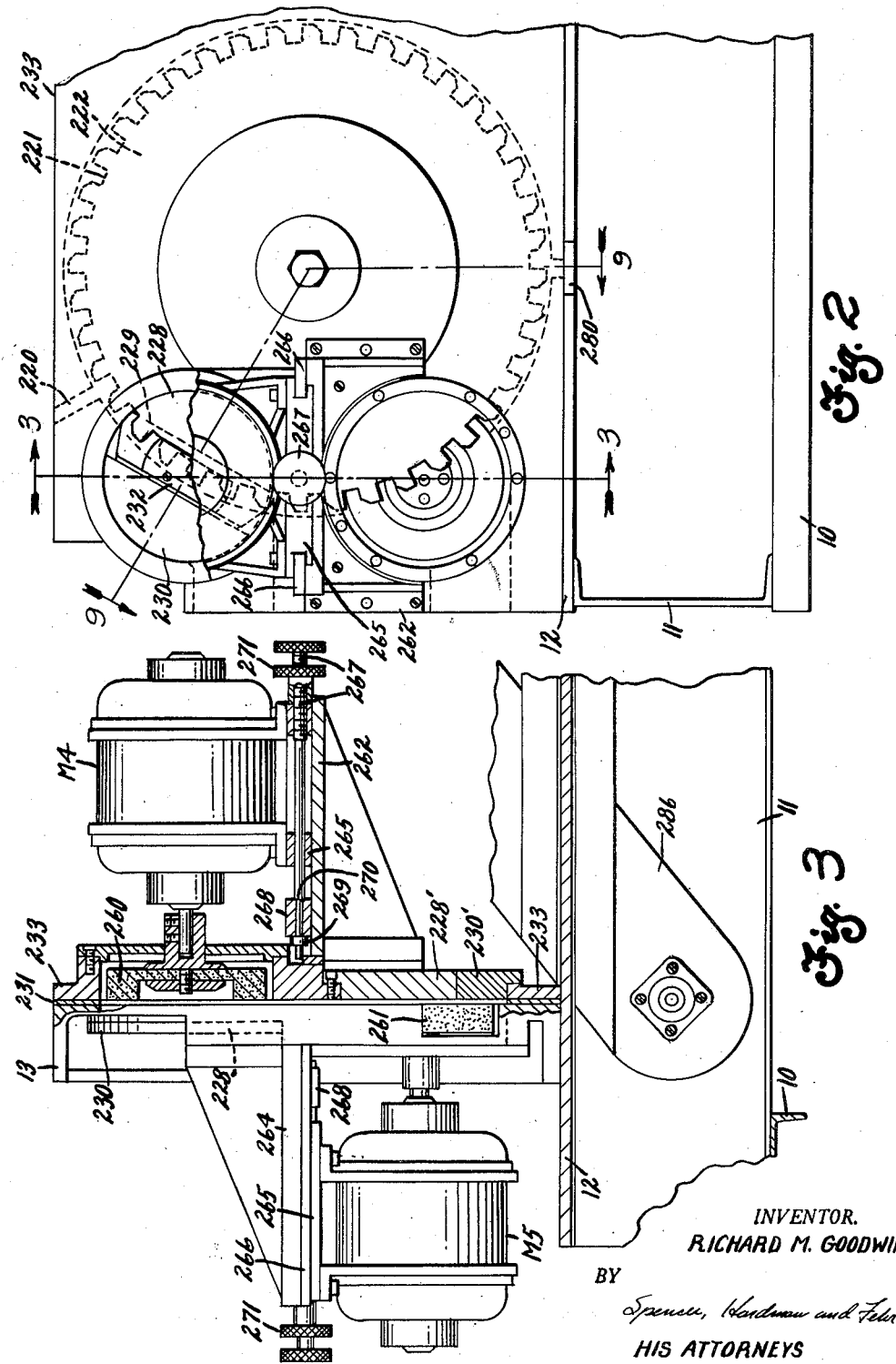
Fig. 2 is an enlargement of parts shown in Fig. 1, with certain housings being removed.
Fig. 3 is a sectional view taken along line 3—3 of Fig. 2.
Figure 10:
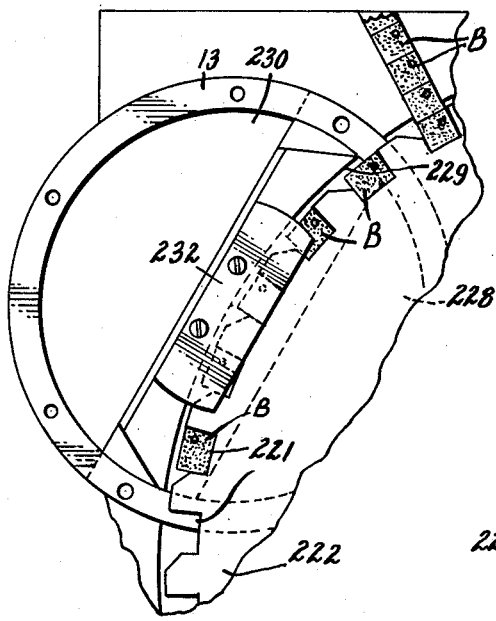
Fig. 10 is a fragmentary view, in elevation, taken along line 10—10 of Fig. 9.

Fig. 14 is an enlarged fragmentary view showing the screw, feed and lock of Fig. 3.

Figure 15:
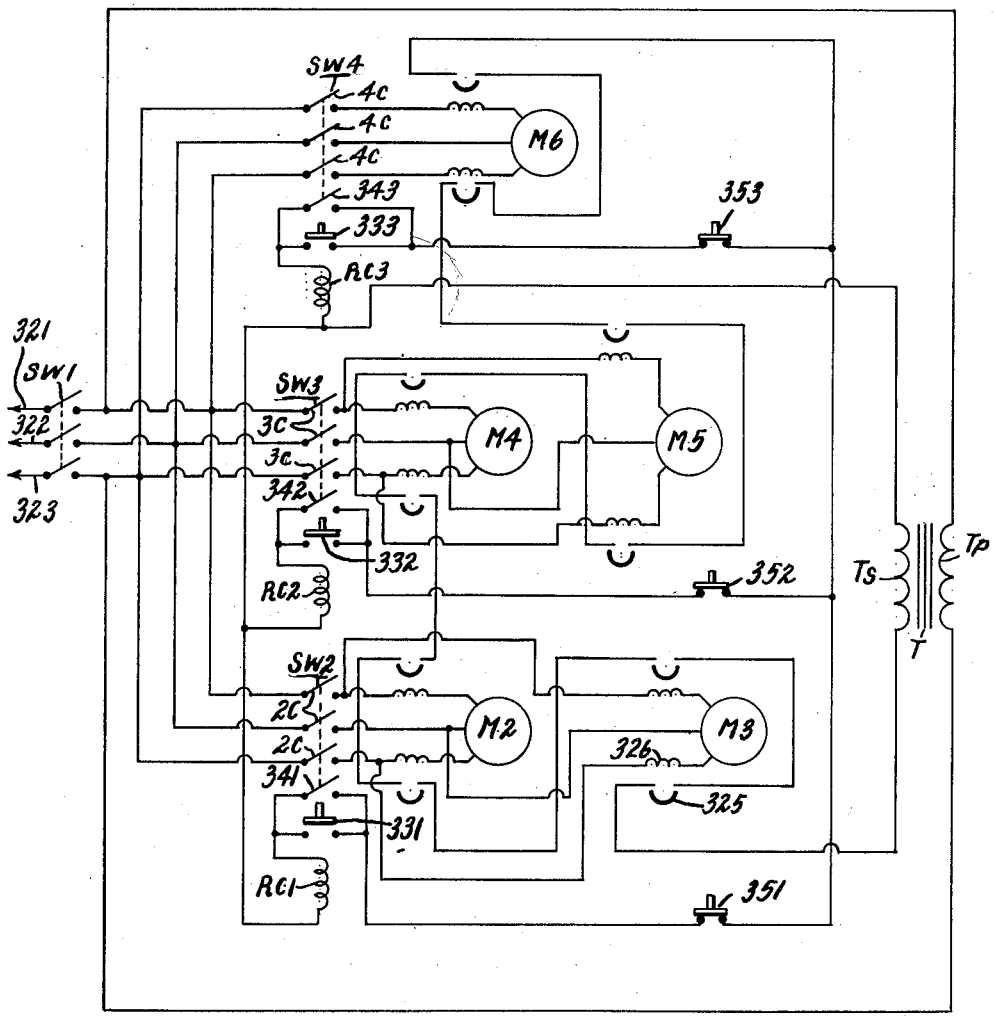

Fig. 15 is an electrical diagram.

Figure 9:
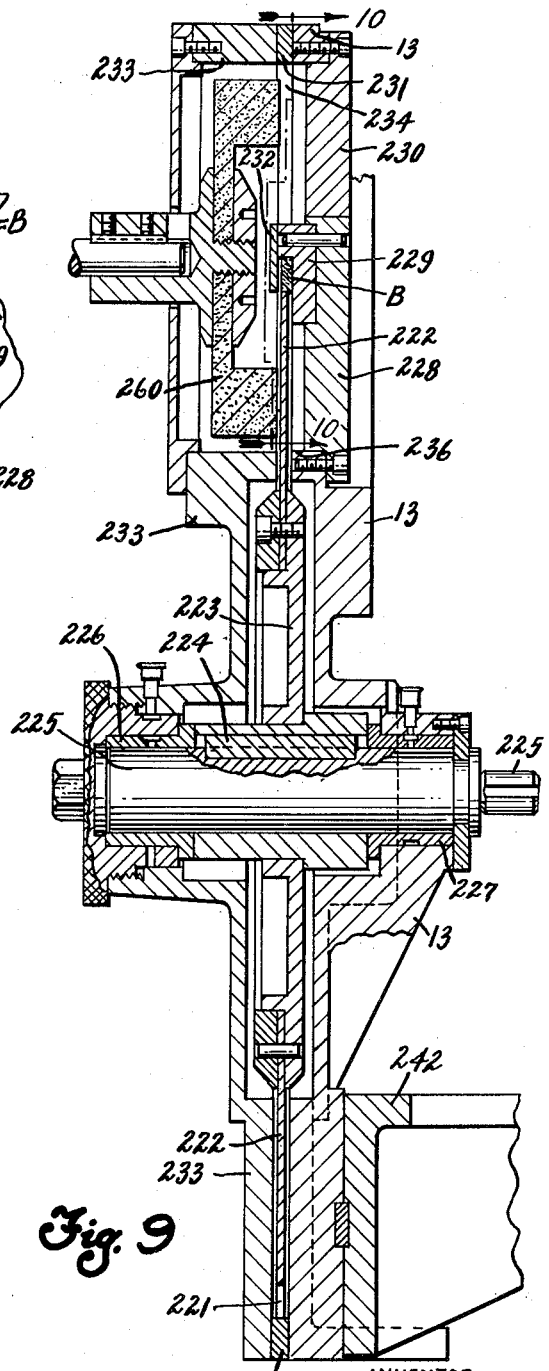
Fig. 9 is an enlarged sectional view taken along line 9—9 of Fig. 2.

With particular reference to the drawings, the machine comprises base channels 10 which support channels 11 upon which a plate 12 carrying a lower frame 13 (Fig. 9) is mounted. The lower frame 13 is connected to a frame 233 (Fig. 9) and together frames 13 and 233 support an upper frame 14. The upper frame 14 supports a rotary hopper 26 driven by a suitable motor, not shown, which supplies brushes B to a chute 27 attached to the frame 14. As shown in Fig. 1, the brushes descend from the chute 27 into a channel 31 formed by a member 30 and, thence, into a channel 32. The channel 32 is covered by a plate 33 secured to the frame 14 by thumb screws, as indicated by 34. The brushes which descend through channel 32 are positioned in pockets 36 formed in a dial 35.

A stationary disc 37 is located in a central recess of the dial 35, the disc 37 having a horizontal slot therethrough. When the brushes arrive at the horizontal position, they are located for ejection from the disc which is effected by a bar 121, the bar being guided for horizontal movement by rails 122 attached to the frame 14. As shown in Fig. 1, the bar 121 is anchored to a block 123 that is in turn secured to a rod associated with a piston in the cylinder C2. The block 123 carries a roller 125, the roller being engageable with a cam 126 which, in a manner to be described, is moved automatically downward, as viewed in Fig. 1, at a predetermined rate. The rate of movement of the cam 126 determines the rate of movement of the slide 121 after the roller 125 has engaged the cam 126. When the rod connected for movement with the piston of the cylinder C2 moves to the left, the slide 121 pushes the brushes from the right to the left (Fig. 1) and out the left-hand pocket 36 of the dial. As the brushes are pushed out, they are received by a channel provided by a guide 130 and retained by a cover 131 suitably secured to the frame 14. The cover 131 together with the frame 14 provide an enclosure for a grinding wheel 133 (Figs. 1 and 13) as attached to a shaft 134 supported by suitable bearings in a bracket 135, the bracket being slidably supported for horizontal adjustment on a shelf 136 (Fig. 1). This adjustment is effected by a turning of a screw 137 and after the adjustment has been made, the bracket 135 is retained in position by means of screw devices 139 (Fig. 1). Shelf 136 is integral with a vertical plate 140, the plate being guided for vertical movement by rails 141 attached to the frame 14 (Fig. 1). Plate 140 is adjusted vertically by turning of a screw 142 which is threaded through a bar 143, and is locked in adjusted position by a screw, not shown.

As the brushes are forced by the bar 121 through the guide 130, they move successively under the grinding wheel 133 and then out into a channel 220 through which they gravitate to side surface grinding wheels to be described. After the brushes B are pushed under the grinding wheel 133, the channel 220 curves downwardly and the brushes fall by gravity into the notches 221 of a disc 222, as clearly shown in Fig. 12. During movement of the ejector bar 121 (Fig. 1), and its associated block 123, actuation of the plunger 150 and the roller 151 of the valves V3 and V4, respectively, is effected by means of a projection 123P, the plunger and roller being urged downwardly by means of springs, not shown. As seen in Fig. 1, motor M2 supported by the frame 14 is connected through pulley 147, belt 148 and pulley 149 with the shaft 134 which operates the grinder wheel 133.

After the brushes have been passed under the grinding wheel 133, they pass down channel 220 and descend into notches 221 provided by a feed disc 222 (Figs. 1 and 12). The feed disc 222 is provided with a hub 223 attached by key 224 to a shaft 225 journaled in bearings 226 and 227 (Fig. 9), the bearings being supported by frame 13 and a frame 233 attached thereto with spacer 231 therebetween. The disc 222 receives a brush B and moves it in a channel or annular brush guide bounded on its sides by parts 13 and 233, and by cylindrical surfaces of parts 13 and 231. When these parts are interrupted by pockets 234 for grinding wheels, the annular brush guide is continued by a plate 229 attached to the cover member 228 and a plate 232 attached to the plate 229. The shape and construction of cover members 228 and 230, as well as plates 229 and 232, are clearly shown in Figs. 6 through 8. The cover 228 is recessed to receive the plate 229, and the plate 229 has an arcuate recess therein which is closed by plate 232 to form the continuation of the annular brush guide. Cover members 228 and 230 are circularly segmental in contour. Member 228 subtends an arc greater than 180° so as to support plates 229 and 232, and member 230 less than 180°. Together, the members 228 and 230 provide a disc having a cylindrical portion which is received by and closes the open end of a hole, or bore, in the frame 13. If the member 230 is removed, plate 229 may be removed from the cover member 228 thereby permitting removal of the cover member 228 so as to permit access to the grinding wheel 260. As shown in Fig. 3, cover members 228' and 230' attached to frame 233, close a pocket which receives a grinding wheel 261.

The shaft 225 is connected by coupling 240 with a speed reducer contained in a housing 241 mounted on a shelf 242 supported by frame 13. Referring to Figs. 4 and 15, a motor M6 drives a pulley 243 connected by a belt 244 with a pulley 245 which, as shown in Figs. 4 and 5, is connected by a torque limiting clutch 246 with a shaft 247 which is the input shaft of the speed reducer. In case a brush jams while being conveyed by the disc 222, the clutch 246 yields to prevent excessive transmission of torque.

The disc 222 moves the brushes successively past the grinding wheels 260 and 261 (Fig. 7) driven, respectively, by motors M4 and M5 supported, respectively, by shelves 262 and 264 attached, respectively, to frames 233 and 13. Each motor is supported by a base 265 (Figs. 3 and 14) guided by rails 266 and having threaded engagement with a screw 267 which is supported by the base 265 and by a lug 268 of the supporting shelf, said lug receiving shoulders 269 and 270 of the screw whereby axial movement thereof is prevented. By turning the screw 267, the location of the grinding faces of the wheels can be adjusted. Screw 267 is locked in adjusted position by nut 271.

After the brushes are ground by the wheels 260, 261, they gravitate from the feed disc 222 through an opening 280 in plate 12 (Fig. 2) and fall upon a conveyor belt 281 (Fig. 1) passing around pulley 282 and pivotally supported on shaft 284, respectively, which is supported by plates 286 attached to angles 287, attached to plate 12. A motor drives the conveyor belt 281 and the brushes conveyed thereby gravitate upon a chute and into a bin or box, not shown.

The housings of the grinding wheels can be connected with a dust exhaust system, for example, the housing for wheel 133 (Figs. 1 and 13) may be connected by a passage 300 in frame 14 and connected by a duct with the suction pipe of the exhaust system.

Referring to Fig. 15, three-phase wires 321—322—323 are connected by manually operated switch SW1 with terminals of switches SW2, SW3 and SW4. Switch SW2 has three pairs of contacts 2c for making connection with motors M2 and M3 and switch SW3 has three pairs of contacts 3c for making connections with motors M4 and M5 and switch SW4 has three pairs of contacts 4c for making connection with motor M6. These pairs of contacts are closed respectively, in response to energization of relay coils RC1, RC2, RC3, which receive current from the secondary winding Ts of transformer T whose primary winding Tp is connected with wires 323 and 321 through switch SW1. The transformer secondary is connected with a series circuit which includes ten thermal overload circuit breakers 325, two for each of the five motors, each circuit breaker being heated by a heating element 326 in a motor lead. The relay coils RC1, RC2 and RC3 are energized in response to the closing of start switches 331, 332 and 333 respectively. When switches SW2, SW3 and SW4 are closed, contacts 341, 342 and 343 by-passing switches 331, 332 and 333 are closed by relays RC1, RC2 and RC3 respectively. These relays are deenergized respectively in response to the opening of stop switches 351, 352 and 353. If any one of the five motors becomes heated so that a thermal overload circuit breaker 325 opens, all the motors stop.

While the embodiment of the present invention as herein disclosed, constitutes a preferred form, it is to be understood that other forms might be adopted.

What is claimed is as follows:

1. A brush grinding machine comprising frame members which provide parallel plane surfaces and a cylindrical surface, said surfaces forming the walls of an annular brush guide, a rotary brush-feeding disc having its peripheral portion received between the parallel surfaces and within the cylindrical surface and provided with brush-receiving notches, openings through the cylindrical surface respectively for the entrance of brushes into the brush guide and exit of brushes therefrom, rotary grinding wheels having annular surfaces engageable respectively with opposite sides of a brush as it is moved by the disc, the frames providing pockets which receive the wheels and which interrupt the walls of the brush guide and covers attached to the frames and closing the pockets and providing continuation of the walls of the annular brush guide.

2. A machine according to claim 1 in which each cover is a disc comprising separable members of circularly-segmental contours, one subtending greater than 180° and the other less, each complete cover disc providing a cylindrical portion received by a bore in the cover-supporting frame in alignment with the wheel-receiving pocket of the other frame, and parts which provide continuation of the walls of the annular brush guide supported by the larger cover disc member.

3. A brush grinding machine including in combination, a pair of members which define an annular brush guide, said brush guide having walls constituted by spaced, parallel surfaces and a cylindrical surface of said members, a rotatable brush-feeding disc having its peripheral portion received between said parallel surfaces and within said cylindrical surface, said disc having a plurality of circumferentially spaced brush receiving notches therein, said cylindrical surface having openings for the entrance and exit of brushes from the brush guide, means for imparting rotation to said disc, a pair of grinding elements engageable with opposite sides of the brushes as said brushes are moved through said brush guide by said disc, and a pair of shafts for supporting the pair of grinding elements, the axes of said shafts being disposed in spaced parallel planes whereby the grinding elements are spaced circumferenetially with respect to said disc.

References Cited in the file of this patent

UNITED STATES PATENTS

| 1,034,362 | Guppey | July 30, 1912 |
| 1,332,248 | Doane | Mar. 2, 1920 |
| 1,611,135 | Sanford | Dec. 14, 1926 |
| 1,749,329 | Emmert | Mar. 4, 1930 |
| 1,923,931 | Jones | Aug. 22, 1933 |
| 2,352,551 | Kende | June 27, 1944 |
| 2,377,982 | Theler | June 12, 1945 |
| 2,418,770 | Holister | Apr. 8, 1947 |
| 2,624,981 | Kenyon | Jan. 13, 1953 |